(12) United States Patent
Ryan et al.

(10) Patent No.: US 9,360,647 B2
(45) Date of Patent: Jun. 7, 2016

(54) CENTRAL-TUBE CABLE WITH HIGH-CONDUCTIVITY CONDUCTORS ENCAPSULATED WITH HIGH-DIELECTRIC-STRENGTH INSULATION

(75) Inventors: James Leonard Ryan, Denver, NC (US); Denise Matthews, Newton, NC (US); Brian G. Risch, Hickory, NC (US); Frank Edwards Davidson, Granite Falls, NC (US)

(73) Assignee: Draka Comteq, B.V., Amsterdam (NL)

( * ) Notice: Subject to any disclaimer, the term of this patent is extended or adjusted under 35 U.S.C. 154(b) by 1254 days.

(21) Appl. No.: 12/700,293

(22) Filed: Feb. 4, 2010

(65) Prior Publication Data

US 2010/0202741 A1    Aug. 12, 2010

Related U.S. Application Data

(60) Provisional application No. 61/150,566, filed on Feb. 6, 2009, provisional application No. 61/155,317, filed on Feb. 25, 2009, provisional application No. 61/252,309, filed on Oct. 16, 2009.

(51) Int. Cl.
*G02B 6/44* (2006.01)
(52) U.S. Cl.
CPC ..................................... *G02B 6/447* (2013.01)
(58) Field of Classification Search
USPC .......................................... 385/109, 113, 114
See application file for complete search history.

(56) References Cited

U.S. PATENT DOCUMENTS

| | | | |
|---|---|---|---|
| 4,838,643 A | 6/1989 | Hodges et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |

(Continued)

FOREIGN PATENT DOCUMENTS

EP            1921478 A1     5/2008
WO      2009/062131 A1     5/2009

OTHER PUBLICATIONS

U.S. Appl. No. 12/098,804 for a "Transmission Optical Fiber Having Large Effective Area," Sillard et al., filed May 6, 2009.

(Continued)

*Primary Examiner* — Tina Wong
(74) *Attorney, Agent, or Firm* — Additon, Higgins & Pendleton, P.A.

(57) ABSTRACT

Disclosed is a novel central-tube cable with high-conductivity conductors. The novel central-tube cable according to the present invention yields a fiber optic cable with a smaller diameter than found in stranded-tube-cable designs.

The central-tube cable features (i) a buffer tube containing optical conductors, (ii) radial strength members, and (iii) high-conductivity conductors coated with a dielectric material, such as polypropylene. The dielectric coating helps to prevent the high-conductivity conductors from shorting.

22 Claims, 6 Drawing Sheets

(56) References Cited

U.S. PATENT DOCUMENTS

| | | | |
|---|---|---|---|
| 6,210,802 B1 | 4/2001 | Risch et al. | |
| 6,215,931 B1 | 4/2001 | Risch et al. | |
| 6,278,825 B1 * | 8/2001 | Casiraghi et al. | 385/100 |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,493,491 B1 | 12/2002 | Shen et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,743,044 B2 * | 6/2004 | Musolf et al. | 439/490 |
| 6,749,446 B2 | 6/2004 | Nechitailo | |
| 6,905,363 B2 * | 6/2005 | Musolf et al. | 439/490 |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,150,656 B1 * | 12/2006 | Baker et al. | 439/668 |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,724,998 B2 | 5/2010 | Parris et al. | |
| 7,817,891 B2 | 10/2010 | Lavenne et al. | |
| 2005/0002622 A1 * | 1/2005 | Sutehall et al. | 385/101 |
| 2007/0019915 A1 | 1/2007 | Overton et al. | |
| 2007/0140631 A1 * | 6/2007 | Pizzorno et al. | 385/112 |
| 2007/0189679 A1 * | 8/2007 | Stahulak et al. | 385/101 |
| 2008/0145010 A1 | 6/2008 | Overton et al. | |
| 2008/0292262 A1 | 11/2008 | Overton et al. | |
| 2009/0046983 A1 * | 2/2009 | Varkey et al. | 385/113 |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0148747 A1 * | 6/2010 | Rathbun et al. | 324/66 |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0209058 A1 * | 8/2010 | Ott | 385/101 |
| 2010/0215327 A1 * | 8/2010 | Braden et al. | 385/101 |

OTHER PUBLICATIONS

Lewis, "Hawley's Condensed Chemical Dictionary", Fifteenth Edition, John Wiley & Sons, Inc., U.S. (2007) pp. 1010, 1011 and 1018.

Odian, "Principles of Polymerization", Second Edition, John Wiley & Sons, U.S. (1981) pp. 29-33.

Shugg, Handbook of Electrical and Electronic Insulating Materials, Second Edition, IEEE Press, Piscataway, NJ, (1995) Chapter 1 (pp. 1 and 3-9); Chapter 3 (pp. 35-108); Chapter 5 (pp. 133 and 135-174); Chapter 10 (pp. 297 and 299-318).

* cited by examiner

CENTRAL-TUBE CABLE WITH HIGH-CONDUCTIVITY CONDUCTORS ENCAPSULATED WITH HIGH-DIELECTRIC-STRENGTH INSULATION

CROSS-REFERENCE TO PRIORITY APPLICATIONS

This application hereby claims the benefit of U.S. Patent Application No. 61/150,566 for a Central Tube Cable with High-Conductivity Conductors Encapsulated with High-Dielectric-Strength Insulation (filed Feb. 6, 2009), U.S. Patent Application No. 61/155,317 (filed Feb. 25, 2009) for a Central Tube Cable with High-Conductivity Conductors Encapsulated with High-Dielectric-Strength Insulation, and U.S. Patent Application No. 61/252,309 for a Central Tube Cable with High-Conductivity Conductors Encapsulated with High-Dielectric-Strength Insulation (filed Oct. 16, 2009), each of which is hereby incorporated by reference in its entirety.

FIELD OF THE INVENTION

The present invention embraces a central-tube cable having high-conductivity conductors encapsulated with high-dielectric-strength insulation.

BACKGROUND

Fiber to the premises/business/home (i.e., FTTx) provides broadband data-transfer technology to the individual end-user. FTTx installations, which are being increasingly deployed throughout the world, are making use of innovative, reduced-cost system designs to promote the expansion of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing is often critical, too. Installation of conduits suitable for traditional cable designs is often prohibitive in existing infrastructure. Thus, existing small ducts or tight pathways have to be used for new fiber installations. Low-cost and reduced-size requirements are driving optical-fiber cables away from conventionally robust and bulky cable designs.

Copper conductors have been incorporated into fiber optic cables of a stranded-tube cable design. In such a stranded-tube cable design, one or more tubes containing optical conductors (e.g., optical fibers) may be stranded alongside tubes containing copper conductors or alongside upjacketed copper conductors.

Stranded-tube cables typically have a larger diameter than is desirable for certain applications, particularly where space is limited. Moreover, it is difficult to access all of the optical conductors at a given access point (e.g., for fusion splicing).

SUMMARY

In one aspect, the invention embraces a central-tube cable having a central buffer tube containing optical fibers. A sheath surrounds the buffer tube. At least one high-conductivity conductor is embedded within the sheath. The high-conductivity conductor is insulted with a dielectric material.

In another aspect, the invention embraces a central-ribbon-tube cable having a buffer tube containing an optical-fiber ribbon stack. A polymeric sheath surrounds the buffer tube so that the buffer tube is centrally positioned within the sheath. A water-swellable material or a thixotropic composition is located between the buffer tube and the polymeric sheath. At least two radial strength members, which are embedded within the sheath, are positioned opposite one another. At least two insulated high-conductivity conductors, which are also embedded within the sheath, are positioned opposite one another, typically adjacent to the corresponding radial strength members.

The high-conductivity conductors of the present central-tube cables are typically insulated by a dielectric material having a dielectric strength of about 600 V/mil or more and a breakdown voltage, per mil of insulation, of 0.6 KV or more.

In general, the diameter of each of the insulated high-conductivity conductors is smaller than (or at least not substantially larger than) the diameter of each of the radial strength members.

Accordingly, the present central-tube-cable design achieves a much smaller cable than is possible with stranded-tube-cable designs. For example, the central-tube-cable design according to the present invention allows for optical-fiber cables having an outer diameter of between about 0.5 inch and 1.5 inches (e.g., 0.65-0.75 inch). By way of comparison, a comparable stranded-tube cable might possess an outer diameter that is about 30 percent larger or more. Furthermore, the presence of the optical conductors within a single buffer tube allows for easier access to the optical conductors.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
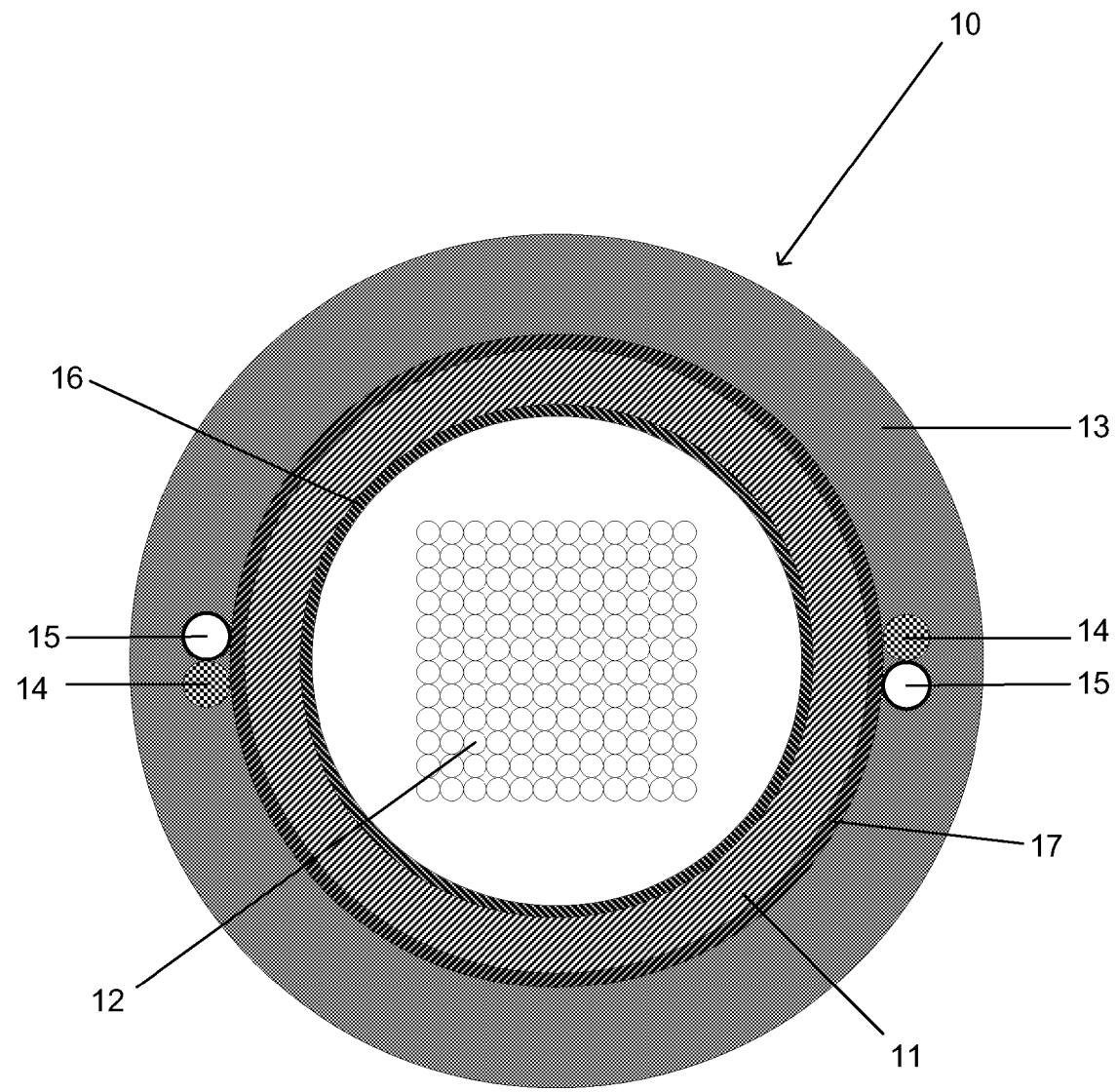
FIG. 1 schematically depicts a cross-sectional view of an exemplary dry central-tube cable according to one embodiment of the present invention.

In one aspect, the present invention embraces a novel central-tube-cable design having one or more high-conductivity conductors, typically copper conductors, embedded in a cable sheath.

As depicted in FIGS. 1-6, the central-tube cable 10 includes a central buffer tube 11 containing ribbonized optical fibers 12, although it is within the scope of the present invention to alternatively employ non-ribbonized optical fibers. A cable sheath 13 surrounds the central buffer tube 11.

FIGS. 1-6 depict twelve 12-fiber ribbons (i.e., 144 optical fibers) arranged in a rectangular ribbon stack. Those having ordinary skill in the art will appreciate that the present central-tube cable is not so limited. By way of example, the present central-tube cable may employ fiber counts of 864 optical fibers (e.g., a 24×36 optical-fiber ribbon stack or a 48×18 optical-fiber ribbon stack). One particular cable embodiment employs 432 optical fibers in a 24×18 fiber ribbon stack.

The cable sheath 13 may be a single jacket formed from a dielectric material (e.g., non-conducting polymers), with or without supplemental structural components that may be used to improve the protection (e.g., from rodents) and strength provided by the cable sheath 13. For example, one or more (e.g., two) metallic or fiberglass (e.g., glass-reinforced plastic "GRP") radial strength members 14 may be incorporated into the sheath.

Figure 3:
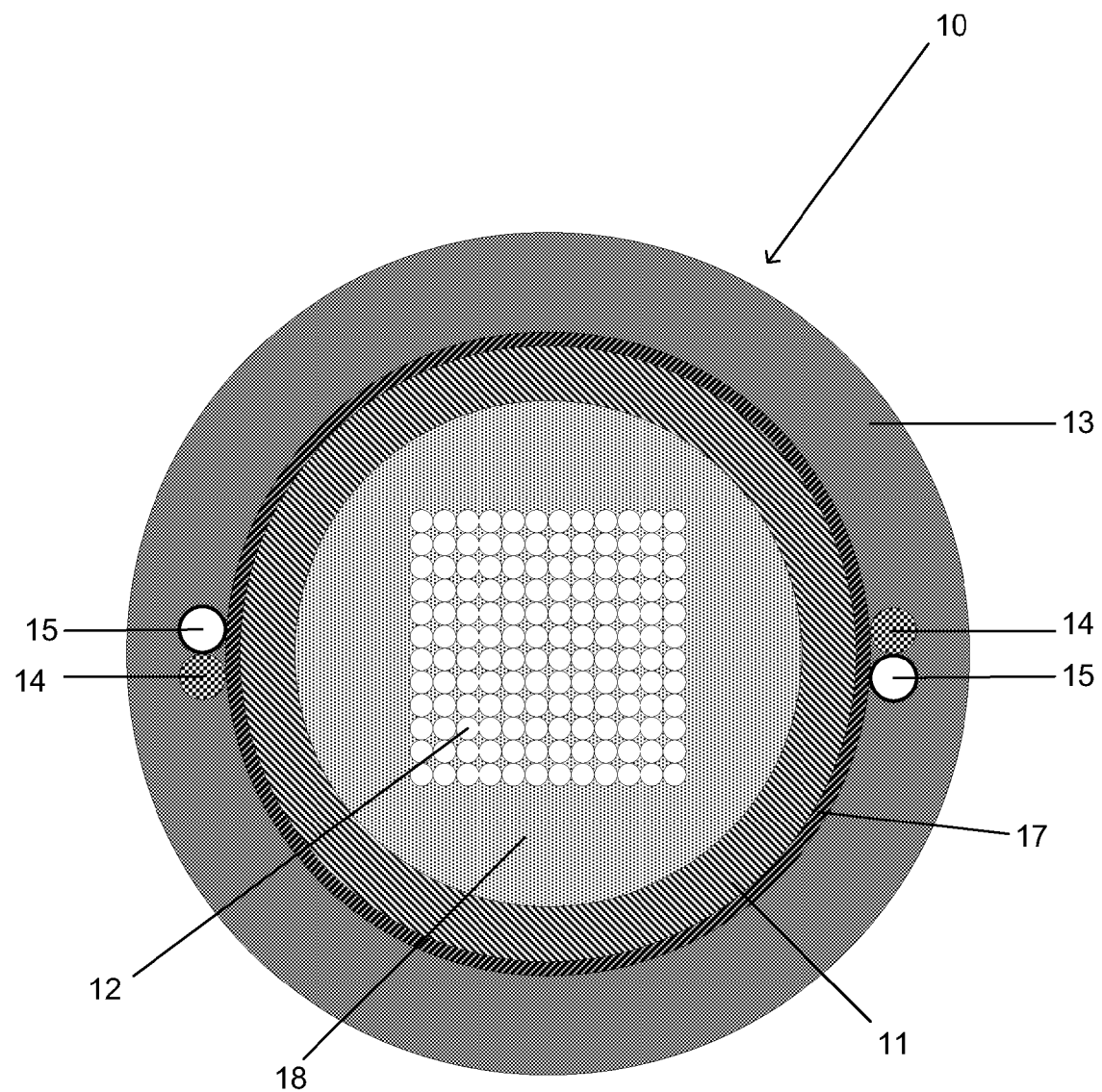
FIG. 3 schematically depicts a cross-sectional view of an exemplary gel-filled central-tube cable according to a third embodiment of the present invention.
Figure 4:
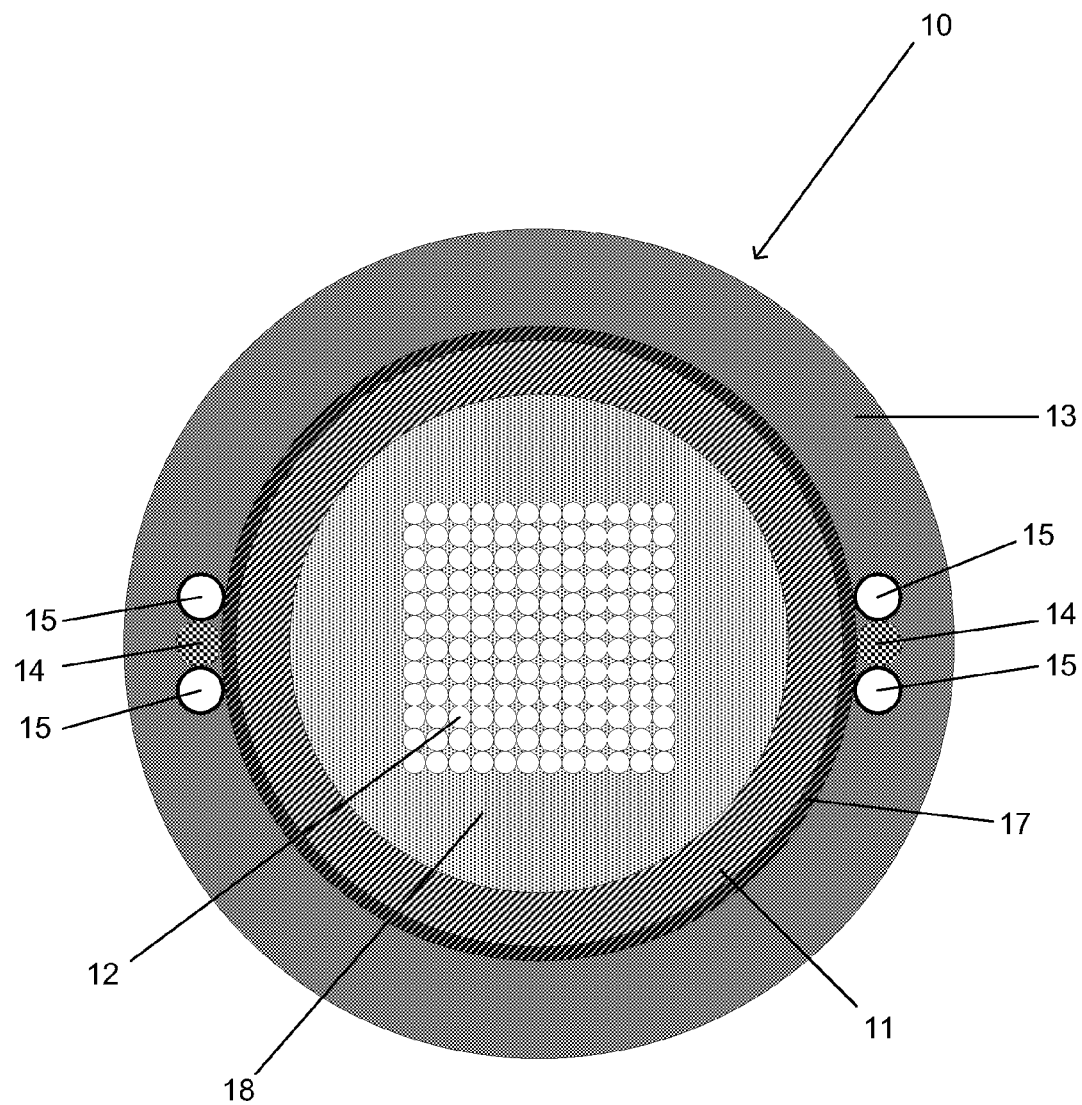
FIG. 4 schematically depicts a cross-sectional view of an exemplary gel-filled central-tube cable according to a fourth embodiment of the present invention.
Figure 5:
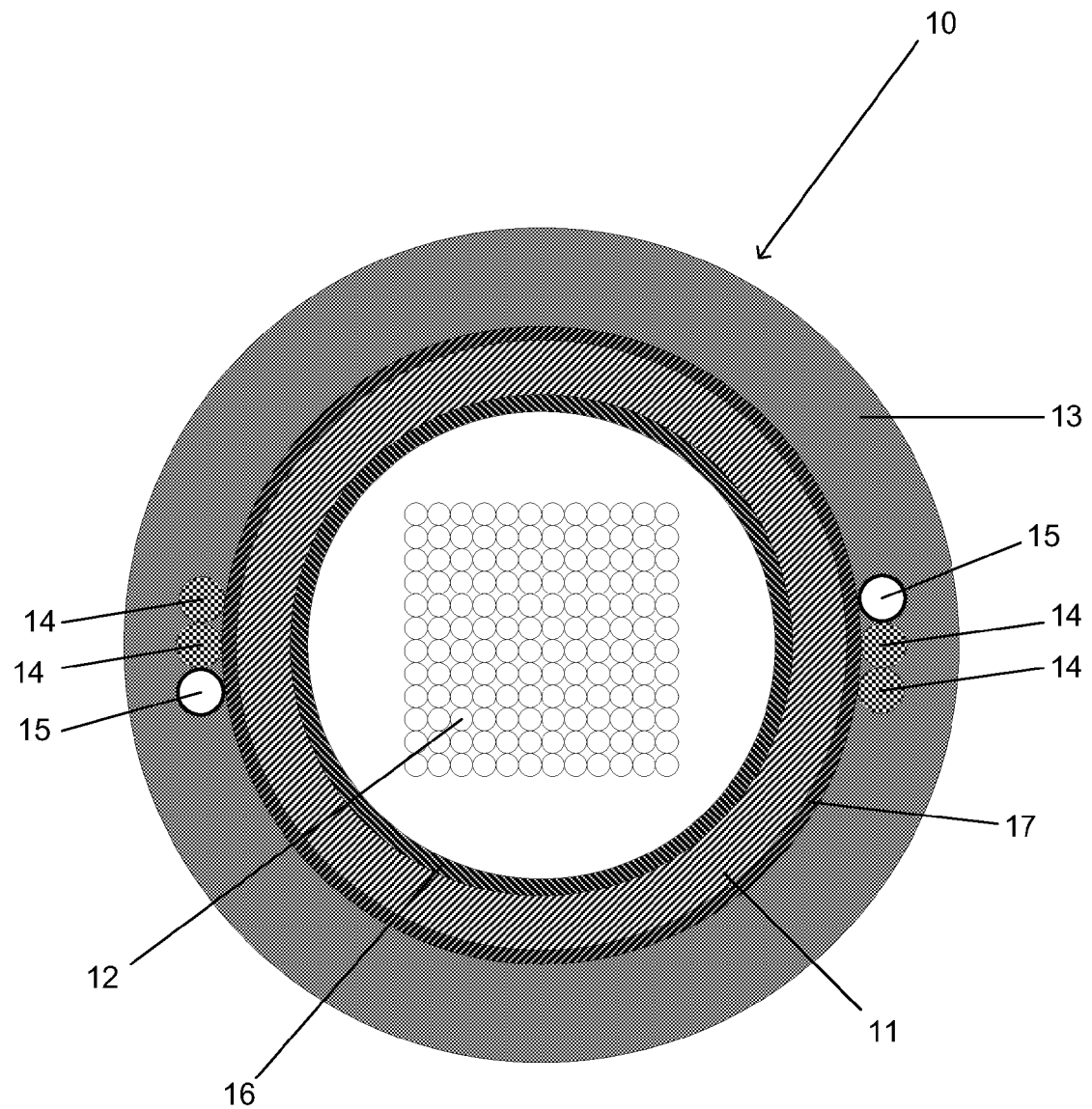
FIG. 5 schematically depicts a cross-sectional view of an exemplary dry central-tube cable according to a fifth embodiment of the present invention.
Figure 6:
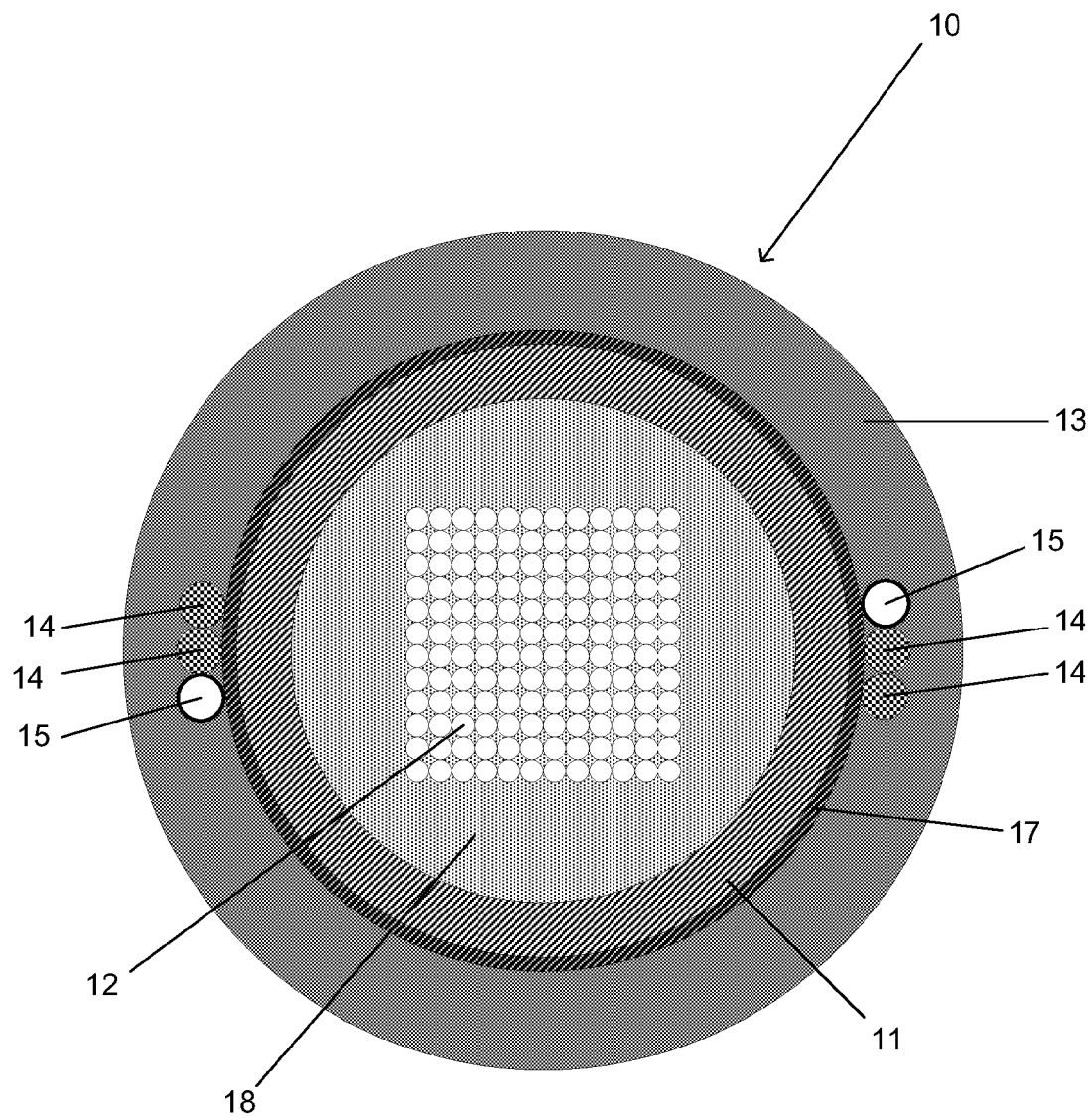
FIG. 6 schematically depicts a cross-sectional view of an exemplary gel-filled central-tube cable according to a sixth embodiment of the present invention.

FIGS. 1-4 depict the central-tube cable 10 with two radial strength members 14. In an alternative embodiment, the central-tube cable 10 may have more than two radial strength members (e.g., 4-8 radial strength members). For example, FIGS. 5-6 depict a central-tube cable 10 employing four radial strength members 14.

By way of further example, one or more layers of metallic (e.g., steel) tape together with one or more dielectric jackets may form the cable sheathing. Furthermore, elements such as ripcords and aramid, fiberglass, or polyester yarns may be incorporated into the cable sheathing.

One or more copper conductors 15 may be embedded within the cable sheath 13. Each copper conductor 15 may include several stranded copper wires or, more typically, a single copper wire. The copper conductors 15 may function as toning wires. Toning wires can be useful for locating fiber optic cables that are buried underground. Other high-conductivity metals (e.g., silver (Ag) or gold (Au)) or metal alloys may be employed as an alternative to copper.

FIGS. 1 and 3 depict two copper conductors 15, each positioned adjacent to a radial strength member 14. Also as depicted in FIGS. 1 and 3, the radial strength members 14 and copper conductors 15 are placed diagonally across from each other so as to not impart asymmetrical bending performance into the cable. In other words, the copper conductors 15 are positioned opposite one another. That is to say that the copper conductors 15 are positioned so that a line intersecting the center of copper conductors 15 also intersects the centroid of the cable sheath 13 (e.g., for a circular sheath, the sheath's center).

Figure 2:
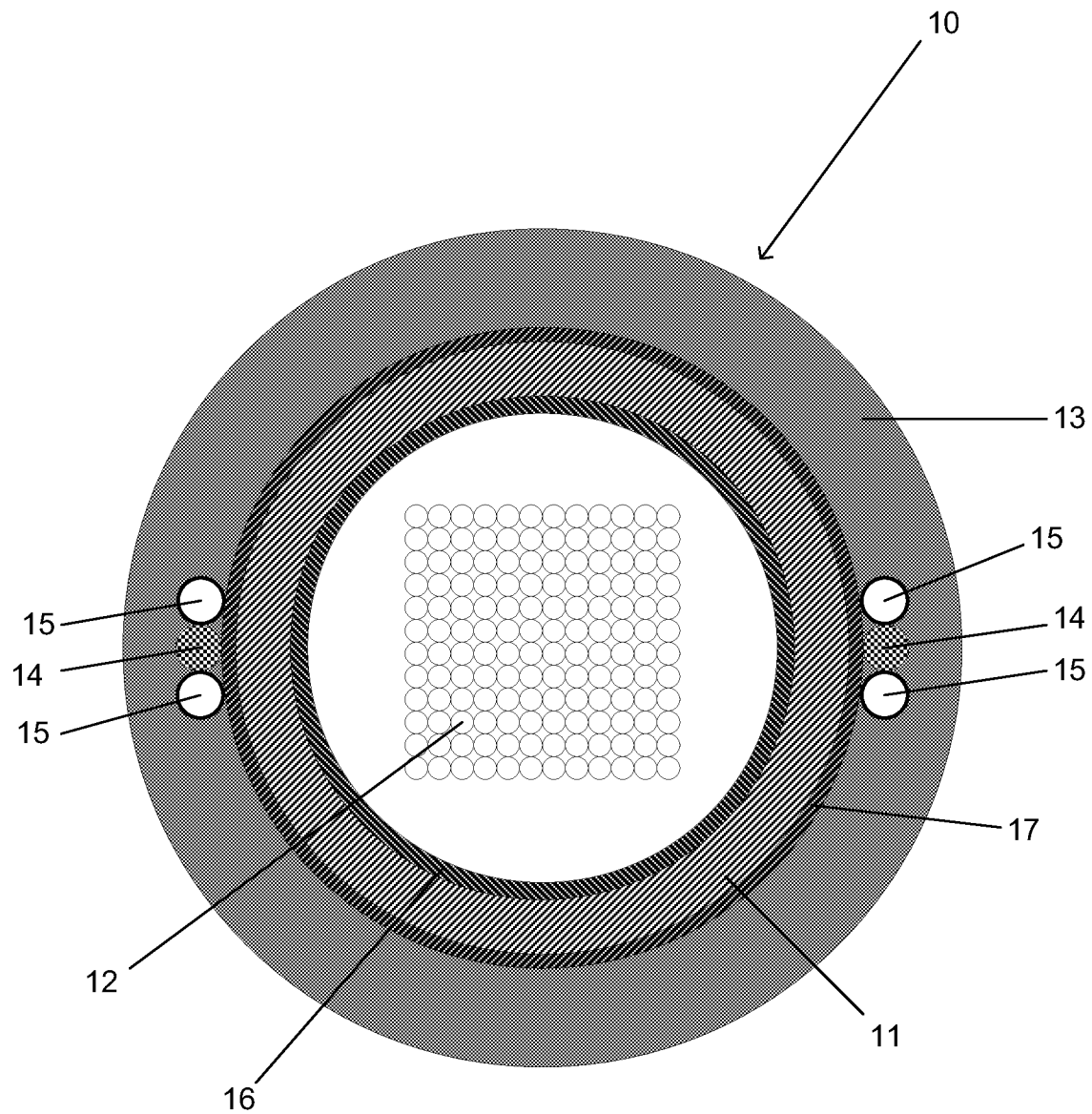
FIG. 2 schematically depicts a cross-sectional view of an exemplary dry central-tube cable according to another embodiment of the present invention.

It is within the scope of the present invention for the cable sheath 13 to have more than two copper conductors. For example, FIGS. 2 and 4 depict the central-tube cable 10 having four copper conductors 15, each positioned next to a radial strength member 14. Also as depicted in FIGS. 2 and 4, the copper conductors 15 may be positioned within the cable sheath 13 so as to not impart asymmetrical bending performance into the cable (i.e., the copper conductors 15 are positioned opposite one another).

The radial strength members 14 and the copper conductors 15 may be embedded in the cable sheath 13 (e.g., via pressure extrusion) at the interface of the cable sheath and the cable core (i.e., the cable elements surrounded by the cable sheath).

The copper conductors 15 typically provide a resistance of less than about 30 ohms per mile, more typically less than about 10 ohms per mile.

By way of example, in a central-tube cable having exactly two copper conductors, to achieve a total resistance of less than about 10 ohms per mile, each copper conductor may be 15 AWG (i.e., "American Wire Gauge") or larger (e.g., 12 AWG). In a central-tube cable having more than two copper conductors, the copper conductors may be smaller (e.g., 18 AWG).

By way of further example, four 18-AWG copper conductors have approximately the same cumulative cross-sectional area as two 15-AWG copper conductors. Therefore, four 18-AWG copper conductors have about the same total resistance as two 15-AWG copper conductors. Moreover, one 12-AWG copper conductor has about the same cross sectional area and total resistance as two 15-AWG copper conductors.

The copper conductors 15 may be coated with a dielectric material (e.g., polypropylene, polyethylene, polyvinyl chloride, or polyamide) to prevent the formation of an electrical short. In this regard, if water is able to breach the cable sheath, then an electrical short to uninsulated copper wires could form.

In a particular embodiment, the copper conductors 15 are coated with polypropylene. One advantage of using polypropylene is that it has a low adhesion to cable-sheath materials, such as polyethylene. Low adhesion allows the insulated copper conductor 15 to be easily withdrawn from the cable sheath 13 during cable access (e.g., mid-span access).

Another advantage, as shown in Table 1 (below), is that polypropylene has superior dielectric strength and breakdown voltage compared with other dielectric materials.

TABLE 1

| (Dielectric Strength) | | |
|---|---|---|
| Insulating Compound | Dielectric Strength (V/mil) | Breakdown Voltage (ten-mil insulation) |
| Polypropylene | 1000 | 10 KV |
| Flexible PVC | 300-600 | 3-6 KV |
| Polyamide (Nylon) | 450 | 4.5 KV |

Consequently, a thinner layer of polypropylene can provide the same insulating protection as a thicker layer of another material (e.g., polyamide). For example, the polypropylene insulating layer may have a thickness of about 0.01 inch (10 mil) on a 14-AWG copper wire.

In another embodiment, the insulating material may be any suitable dielectric compound having a dielectric strength of at least about 600 V/mil and a breakdown voltage, per one mil of insulation, of at least 0.6 KV. In a different embodiment, the insulation may be any suitable dielectric compound having a dielectric strength of at least about 1000 V/mil and a breakdown voltage, per one mil of insulation, of at least 1.0 KV.

In one embodiment, the insulated copper conductors 15 are designed so that the diameter of the insulated copper conductor 15 is no greater (or not substantially greater) than the diameter of the radial strength members 14. This configuration helps to reduce the outer diameter of the central-tube cable 10. For example, 14-AWG copper conductors (i.e., copper conductors having a diameter of about 0.0641 inch) insulated by a polypropylene layer about 0.01 inch thick would have a diameter (i) approximately equal to radial strength members having a diameter of about 0.085 inch and (ii) not substantially greater than radial strength members having a diameter of about 0.075-0.080 inch.

The cable sheath 13 may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The cable sheath materials may contain additives such as nucleating agents, flame-retardants, smoke-retardants, antioxidants, UV absorbers, and/or plasticizers.

FIGS. 1-6 depict the cable sheath 13 as having a circular cross-section. Those having ordinary skill in the art will appreciate, however, that alternative non-circular shapes (e.g., an oval, trapezoidal, or flat cross-section) are within the scope of the present invention.

The cable sheath 13 may surround a water-swellable element 17. The water-swellable element 17 may be a superabsorbent water-blocking tape that is formed from, among other things, an ionic polymer. As noted, having insulated copper conductors helps to prevent water from causing a short between the water-swellable tape 17 and the copper conductors 15. In general, the cable sheath 13 tightly surrounds the water-swellable element 17.

As depicted in FIG. 1, the central-tube cable 10 includes a central buffer tube 11, which is typically surrounded by the water-swellable element 17. The buffer tube 11 may be formed of polyolefins (e.g., polyethylene or polypropylene), including fluorinated polyolefins, polyesters (e.g., polybutylene terephthalate), polyamides (e.g., nylon), as well as other polymeric materials and blends. The materials used to form the buffer tube 11 may contain additives such as nucleating agents, flame-retardants, smoke-retardants, antioxidants, UV absorbers, and/or plasticizers. In general, a buffer tube 11 may be formed of one or more layers. The layers may be homogeneous or include mixtures or blends of various materials within each layer.

In this context, the buffer tube 11 may be extruded (e.g., an extruded polymeric material) or pultruded (e.g., a pultruded, fiber-reinforced plastic). By way of example, the buffer tube 11 may include a material to provide high-temperature and chemical resistance (e.g., an aromatic material or polysulfone material).

Although buffer tubes typically have a circular cross section, the buffer tube alternatively may have a non-circular shape (e.g., an oval or a trapezoidal cross-section).

FIG. 1 depicts the buffer tube 11 containing a stack of ribbonized optical fiber 12. It will be appreciated that multiple optical fibers may be sandwiched, encapsulated, and/or edge bonded to form an optical-fiber ribbon. Optical-fiber ribbons can be divisible into subunits (e.g., a twelve-fiber ribbon that is splittable into six-fiber subunits). Moreover, a plurality of such optical-fiber ribbons may be aggregated to form a ribbon stack, which can have various sizes and shapes. For example, it is possible to form a rectangular ribbon stack or a ribbon stack in which the uppermost and lowermost optical-fiber ribbons have fewer optical fibers than those toward the center of the stack. This construction may be useful to increase the density of optical conductors within the buffer tube and/or cable.

Alternatively, and as noted previously, the buffer tube 11 may contain one or more optical fibers that are not ribbonized. Such optical fibers may be bundled or may be stranded around themselves.

As noted, the present central-tube-cable design achieves a smaller cable than is possible with stranded-tube-cable designs. Accordingly, the present central-tube cables typically have a higher outer cable filling coefficient and cable fiber density than conventional stranded-tube cables.

As used herein, the term "outer cable filling coefficient" specifically refers to the ratio of the sum of the cross-sectional areas of all of the optical fibers within the optical-fiber cable versus the outer cross-sectional area of the optical-fiber cable (i.e., defined by the outer boundary of the protective outer jacket).

Moreover, the term "cable fiber density" of an optical-fiber cable refers to the ratio of the total number of optical fibers within the optical-fiber cable versus the cross sectional area of the optical-fiber cable as defined by the outer boundary of the protective outer jacket.

In this regard, the present central-tube cables typically have a cable fiber density of at least 0.5 fibers/mm$^2$, more typically at least about 0.75 fibers/mm$^2$ (e.g., about 1.0 fibers/mm$^2$ or more). Even higher cable fiber densities (e.g., greater than about 1.1 fibers/mm$^2$) are possible using reduced-diameter optical fibers (e.g., optical fibers having an outer diameter of no more than about 200 microns). Furthermore, the present central-tube cables typically have an outer cable filling coefficient of at least about 0.025 (e.g., between about 0.03 and 0.05).

By way of example, a central-tube cable according to the present invention, which has an outer diameter of about 0.75 inch (i.e., about 19 millimeters) and contains 216 optical fibers having an outer diameter of 242 microns, possesses a cable fiber density of about 0.76 fibers/mm$^2$ and an outer cable filling coefficient of about 0.035.

The buffer tube 11 may contain a number of water-blocking elements. For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable sheathing (e.g., via adhesion, friction, and/or compression). By way of further example, the central-tube cable 10, as depicted in FIGS. 1, 2, and 5, may include a water-swellable tape 16. Exemplary water-swellable tape is disclosed in commonly assigned U.S. Patent Application Publication No. US 2007/0019915 A1 for a Water-Swellable Tape, Adhesive-Backed for Coupling When Used Inside a Buffer Tube (Overton et al.), now U.S. Pat. No. 7,515,795, which is hereby incorporated by reference in its entirety.

An adhesive (e.g., a hot-melt adhesive or curable adhesive, such as a silicone acrylate cross-linked by exposure to actinic radiation) may be provided on any water-blocking elements to bond the elements to the buffer tube 11. An adhesive material may also be used to bond the water-blocking elements to optical fibers within the buffer tube 11. Exemplary arrangements of such elements are disclosed in commonly assigned U.S. Patent Application Publication No. US 2008/0145010 A1 for a Gel-Free Buffer Tube with Adhesively Coupled Optical Element (Overton et al.), now U.S. Pat. No. 7,599,589, which is hereby incorporated by reference in its entirety.

The buffer tube 11 may be gel-filled. In other words, the buffer tube 11 may contain a thixotropic composition (e.g., grease or grease-like gels) between the optical fibers and the interior walls of the buffer tubes. For example, FIGS. 3, 4, and 6 depict a thixotropic composition 18 contained within the buffer tube 11.

Filling the free space inside the buffer tube 11 with water-blocking, petroleum-based filling grease helps to block the ingress of water. Furthermore, the thixotropic filling grease 18 mechanically (i.e., viscously) couples the ribbonized optical fibers 12 to the surrounding buffer tube 11.

Such thixotropic filling greases are relatively heavy and messy, however, thereby hindering connection and splicing operations. Thus, as noted, in another embodiment the present invention employs a dry cable structure (i.e., the buffer tube 11 may be substantially free of thixotropic compositions). FIGS. 1, 2, and 5 depict exemplary dry cable structures.

Exemplary buffer tube structures that are free from thixotropic filling greases are disclosed in commonly assigned U.S. Patent Application Publication No. US2009/0003785 A1 for a Coupling Composition for Optical Fiber Cables, filed Jun. 26, 2008, (Parris et al.), which is hereby incorporated by reference in its entirety. Such buffer tubes may employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); and U.S. patent application Ser. No. 12/694,559 for a Single-Mode Optical Fiber, filed Jan. 27, 2010, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water- Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); and U.S. patent application Ser. No. 12/649,758 for a UVLED Apparatus for Curing Glass-Fiber Coatings, filed Dec. 30, 2009, (Hartsuiker et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A central-tube cable, comprising:
   a plurality of optical fibers;
   a central buffer tube enclosing said plurality of optical fibers;
   a sheath surrounding said central buffer tube; and
   one or more insulated high-conductivity conductors embedded within said sheath, wherein said one or more high-conductivity conductors are insulated by a polypropylene dielectric material having a dielectric strength of at least about 1000 V/mil and wherein said high-conductivity conductors are insulated by a polypropylene dielectric material having low adhesion to said sheath within which said high-conductivity conductors are embedded.

2. A central-tube cable according to claim 1, comprising one or more strength members embedded within said sheath.

3. A central-tube cable according to claim 2, wherein said one or more strength members comprise glass-reinforced plastic.

4. A central-tube cable according to claim 2, wherein the diameter of each of said one or more insulated high-conductivity conductors is no greater than about the diameter of each of said one or more strength members.

5. A central-tube cable according to claim 2, wherein said one or more strength members and said one or more insulated high-conductivity conductors are positioned so as to not impart asymmetrical bending performance into said central-tube cable.

6. A central-tube cable according to claim 1, comprising two insulated high-conductivity conductors, wherein said insulated high-conductivity conductors are positioned opposite from one another.

7. A central-tube cable according to claim 6, wherein said high-conductivity conductors have a combined resistance less than or equal to about 10 ohms per mile.

8. A central-tube cable according to claim 1, wherein said one or more high-conductivity conductors have a combined resistance less than or equal to about 10 ohms per mile.

9. A central-tube cable according to claim 1, wherein said one or more high-conductivity conductors comprise copper.

10. A central-tube cable according to claim 1, wherein said polypropylene dielectric material has a breakdown voltage, per mil of insulation, of at least 1.0 KV.

11. A central-tube cable according to claim 1, wherein said plurality of optical fibers comprises a one or more optical-fiber ribbons.

12. A central-tube cable according to claim 11, wherein said plurality of optical-fiber ribbons is arranged as a ribbon stack.

13. A central-tube cable according to claim 1, wherein said plurality of optical fibers comprises a bundle of optical fibers.

14. A central-tube cable according to claim 1, comprising a water-swellable tape positioned between said sheath and said central buffer tube.

15. A central-tube cable according to claim 1, comprising a thixotropic compound positioned within said central buffer tube.

16. A central-tube cable according to claim 1, wherein said central buffer tube is substantially free of thixotropic compounds.

17. A central-tube cable according to claim 1, comprising a water-swellable tape positioned within said central buffer tube.

18. A fiber optic cable, comprising:
   a plurality of optical fibers arranged as a ribbon stack;
   a buffer tube enclosing said ribbon stack;
   a polymeric sheath surrounding said buffer tube, said buffer tube being centrally positioned within said sheath;
   a water-swellable material positioned between said buffer tube and said sheath;
   at least two radial strength members embedded within said sheath, said radial strength members positioned opposite one another; and at least two insulated high-conductivity conductors embedded within said sheath, wherein at least two of said high-conductivity conductors are positioned opposite one another and at least one of said high-conductivity conductors is positioned adjacent to one of said radial strength members;

wherein said high-conductivity conductors are insulated by a polypropylene dielectric material having a dielectric strength of at least about 1000 V/mil and a breakdown voltage of at least about 1.0 KV per mil of insulation;

wherein said high-conductivity conductors are insulated by a polypropylene dielectric material having low adhesion to said sheath within which said high-conductivity conductors are embedded; and wherein the diameter of each of said insulated high-conductivity conductors is less than or about equal to the diameter of each of said radial strength members.

19. A fiber optic cable according to claim 18, wherein each of said insulated high-conductivity conductors is positioned adjacent to a radial strength member.

20. A fiber optic cable according to claim 18, comprising four radial strength members embedded within said sheath.

21. A fiber optic cable according to claim 18, wherein each of said insulated high-conductivity conductors is an insulated copper conductor.

22. A central-tube cable according to claim 1, wherein said sheath comprises polyethylene.

\* \* \* \* \*